United States Patent
Wu et al.

(10) Patent No.: US 10,476,897 B2
(45) Date of Patent: *Nov. 12, 2019

(54) METHOD AND APPARATUS FOR IMPROVING NETWORK SECURITY

(71) Applicant: Huawei Technologies Co., Ltd., Shenzhen (CN)

(72) Inventors: Xiaoxin Wu, Shenzhen (CN); Jinming Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,841

(22) Filed: Jul. 5, 2017

(65) Prior Publication Data

US 2017/0302690 A1    Oct. 19, 2017

Related U.S. Application Data

(63) Continuation of application No. 14/583,367, filed on Dec. 26, 2014, now Pat. No. 9,762,594.

(30) Foreign Application Priority Data

Dec. 27, 2013   (CN) .......................... 2013 1 0740440

(51) Int. Cl.
*H04L 29/00* (2006.01)
*H04L 29/06* (2006.01)
*G06F 21/55* (2013.01)

(52) U.S. Cl.
CPC ........ *H04L 63/1416* (2013.01); *G06F 21/554* (2013.01); *H04L 63/101* (2013.01); *H04L 2463/146* (2013.01)

(58) Field of Classification Search
CPC .......... G06F 21/50; G06F 21/57; G06F 21/60; G06F 21/577; G06F 21/554;
(Continued)

(56) References Cited

U.S. PATENT DOCUMENTS

| | | | |
|---|---|---|---|
| 2004/0003286 A1* | 1/2004 | Kaler | G06F 21/554 726/25 |
| 2010/0122335 A1 | 5/2010 | Van der Merwe et al. | |
| 2011/0179492 A1* | 7/2011 | Markopoulou | G06F 21/552 726/25 |

FOREIGN PATENT DOCUMENTS

| | | |
|---|---|---|
| CN | 102916959 A | 2/2013 |
| CN | 103391546 A | 11/2013 |

OTHER PUBLICATIONS

Cisco "Risk Rating and Threat Rating: Simplifying IPS Policy Management" (Oct. 31, 2007) (Year: 2007).*
(Continued)

*Primary Examiner* — Jeffrey C Pwu
*Assistant Examiner* — Helai Salehi
(74) *Attorney, Agent, or Firm* — Conley Rose, P.C.

(57) ABSTRACT

A method and an apparatus for improving network security. The method includes obtaining, by a control node, alarm information, where the alarm information includes address information of an attack source that attacks a subnet of at least two subnets and identification information of the attacked subnet of the at least two subnets, using, by the control node, the alarm information to sort the attack sources in descending order of threat levels, and using a sorting result as a blacklist, and sending, by the control node, the obtained blacklist to at least one subnet that is not attacked yet in the network system. The method and apparatus are applicable to collaborative defense among multiple subnets.

17 Claims, 13 Drawing Sheets

(58) Field of Classification Search
CPC ......... H04L 29/06877; H04L 29/06884; H04L 29/06904; H04L 63/1416
See application file for complete search history.

(56) References Cited

OTHER PUBLICATIONS

Machine Translation and Abstract of Chinese Publication No. CN102916959, Feb. 6, 2013, 10 pages.
Machine Translation and Abstract of Chinese Publication No. CN103391546, Nov. 13, 2013, 12 pages.
Zhang, J., et al., "Highly Predictive Blacklisting," USENIX Association, 17th USENIX Security Symposium, Dec. 31, 2008, pp. 107-122.
Ma, X., et al., "Honeynet-based Collaborative Defense using Improved Highly Predictive Blacklisting Algorithm," Proceedings of the 8th World Congress on Intelligent Control and Automation, Jul. 6-9, 2010, pp. 1283-1288.
"OpenFlow Switch Errata," Open Networking Foundation, Version 1.0.2, ONF TS-013, Nov. 1, 2013, 12 pages.
Cisco, "Risk Rating and Threat Rating: Simplify IPS Policy Management," XP055187190, White Paper, Oct. 31, 2007, 4 pages.
Foreign Communication From a Counterpart Application, European Application No. 14199564.7, European Communication under Rule 71(3) EPC dated Apr. 28, 2016, 57 pages.
Foreign Communication From a Counterpart Application, Chinese Application No. 201310740440.6, Chinese Office Action dated Jul. 5, 2017, 8 pages.
Foreign Communication From a Counterpart Application, European Application No. 14199564.7, Extended European Search Report dated May 21, 2015, 8 pages.

\* cited by examiner

METHOD AND APPARATUS FOR IMPROVING NETWORK SECURITY

CROSS-REFERENCE TO RELATED APPLICATIONS

This application is a continuation of U.S. patent application Ser. No. 14/583,367, filed on Dec. 26, 2014, which claims priority to Chinese Patent Application No. 201310740440.6, filed on Dec. 27, 2013, both of which are hereby incorporated by reference in their entireties.

TECHNICAL FIELD

The present disclosure relates to the field of network communications technologies, and in particular, to a method and an apparatus for improving network security.

BACKGROUND

Currently, to improve network security, association needs to be implemented between each network device in a subnet and a network security device so that all the network devices in the subnet can perform collaborative defense when the subnet is attacked. To implement the association between the network devices and the network security device, a manufacturer of the network security device needs to provide an interface protocol so that a manufacturer of the network devices can develop a corresponding communications module according to the interface protocol provided by the manufacturer of the network security device to implement the association between the network devices and the network security device.

However, for a network system that has multiple subnets, when one subnet is attacked by an attack source, only the directly attacked subnet executes a corresponding security policy. Therefore, the same attack source only needs to launch the same attack on different subnets in the network system. If one of the subnets lacks sufficient defensive measures or is weak in security, this subnet is easily crackable, which decreases security of the entire network system.

SUMMARY

Embodiments of the present disclosure provide a method and an apparatus for improving network security to reduce possibility of cracking a subnet that is not attacked yet and is other than a currently attacked subnet, in a network system, so as to improve security of an entire network system.

To achieve the foregoing objective, the embodiments of the present disclosure use the following technical solutions.

According to a first aspect, an embodiment of the present disclosure provides a method for improving network security, where the network includes a control node and at least two subnets in communication connection with the control node, and the method includes obtaining, by the control node, alarm information, where the alarm information includes address information of an attack source that attacks a subnet of the at least two subnets and identification information of the attacked subnet of the at least two subnets, using, by the control node, the alarm information to sort the attack sources in descending order of threat levels and using a sorting result as a blacklist, and sending, by the control node, the obtained blacklist to at least one subnet that is not attacked yet in the network system.

With reference to the first aspect, in a first possible implementation manner of the first aspect, the using the alarm information to sort the attack sources in descending order of threat levels includes using the identification information of the attacked subnet to determine the number of subnets attacked by each attack source of multiple attack sources corresponding to the address information of the attack sources, and sorting the attack sources in descending order of the number of the attacked subnets.

With reference to the first aspect or the first possible implementation manner, in a second possible implementation manner, the using the alarm information to sort the attack sources in descending order of threat levels includes using the identification information of the attacked subnet to determine the number of ports attacked by each attack source of multiple attack sources corresponding to the address information of the attack sources, and sorting the attack source in descending order of the number of the ports attacked by each attack source.

With reference to the first aspect, in a third possible implementation manner, before sorting the attack sources, the method further includes determining threat information of each attack source, where the threat information includes duration of an attack launched by the attack source, an amount of data from the attack source, the number of subnets attacked by the attack source, and the number of ports attacked by the attack source, and obtaining a threat value of each attack source according to the threat information of the attack source, where the using the alarm information to sort the attack sources in descending order of threat levels, and using a sorting result as a blacklist includes using the alarm information to sort the attack sources in descending order of the threat values of the attack sources, and using a sorting result as a blacklist.

With reference to the third possible implementation manner of the first aspect, in a fourth possible implementation manner, before the sorting the attack sources, the method further includes determining a value of association between each attack source and all the attacked subnets according to $r^s = [(I-aW)^{-1} - I] \bullet b^s$, where $r^s$ represents a value of association between one attack source and all the attacked subnets, $b^s$ represents a Boolean vector of an attack relationship between this attack source and all the attacked subnets, s represents an identifier of this attack source, a represents a threat value of this attack source, I represents an identity matrix, and W represents an address of this attack source, where the using the alarm information to sort the attack sources in descending order of the threat values of the attack sources, and using a sorting result as a blacklist includes for an attacked subnet, using a threat value of each attack source that attacks the subnet and a value of association between each attack source that attacks the subnet and the subnet to determine a danger level imposed by each attack source that attacks the subnet on the subnet, and sorting the attack sources that attack the subnet in descending order of the danger levels and generating a blacklist corresponding to the subnet.

With reference to the fourth possible implementation manner of the first aspect, in a fifth possible implementation manner, before the sorting the attack sources, the method further includes determining harm information of each subnet, where the harm information includes the number of attack sources that attack a subnet, the number of attacked ports of this subnet, duration of attack on this subnet, and a sum of amounts of data received by this subnet from all attack sources, and obtaining a vulnerability value according to the harm information of each subnet, where the using the alarm information to sort the attack sources in descending order of the threat values of the attack sources, and using a sorting result as a blacklist includes for an attacked subnet, using the threat value of each attack source that attacks the subnet, a value of association between each attack source that attacks the subnet and the subnet, and the vulnerability value of the subnet to determine a danger level imposed by each attack source that attacks the subnet on the subnet, and sorting the attack sources that attack the subnet in descending order of the danger levels and generating a blacklist corresponding to the subnet.

With reference to the possible implementation manners of the first aspect, in a sixth possible implementation manner, the obtaining, by the control node, alarm information includes obtaining, by the control node, the alarm information from an Openflow asynchronization message sent by the subnet.

According to a second aspect, an embodiment of the present disclosure provides an apparatus for improving network security, where the network includes a control node and at least two subnets in communication connection with the control node, and the apparatus includes an alarm information receiving module, configured to obtain alarm information, where the alarm information includes address information of an attack source that attacks a subnet of the at least two subnets and identification information of the attacked subnet of the at least two subnets, an analyzing module, configured to use the alarm information to sort the attack sources in descending order of threat levels, and use a sorting result as a blacklist, and a publishing module, configured to send the obtained blacklist to at least one subnet that is not attacked yet in the network system.

With reference to the second aspect, in a first possible implementation manner of the second aspect, the analyzing module includes a harmed subnet statistics unit, configured to use the identification information of the attacked subnet to determine the number of subnets attacked by each attack source of multiple attack sources corresponding to the address information of the attack sources, and a first generating unit, configured to sort the attack sources in descending order of the number of the attacked subnets.

With reference to the second aspect or the first possible implementation manner, in a second possible implementation manner, the analyzing module includes a harmed port statistics unit, configured to use the identification information of the attacked subnet to determine the number of ports attacked by each attack source of multiple attack sources corresponding to the address information of the attack sources, and a second generating unit, configured to sort the attack sources in descending order of the number of the ports attacked by each attack source.

With reference to the second aspect, in a third possible implementation manner, the apparatus further includes a first information collecting module, configured to determine threat information of each attack source before the attack sources are sorted, where the threat information includes duration of an attack launched by the attack source, an amount of data from the attack source, the number of subnets attacked by the attack source, and the number of ports attacked by the attack source, and a first attack source evaluating module, configured to obtain a threat value of each attack source according to the threat information of the attack source, where the analyzing module further includes a third generating unit, configured to use the alarm information to sort the attack sources in descending order of the threat value of each attack source, and use the sorting result as the blacklist.

With reference to the third possible implementation manner of the second aspect, in a fourth possible implementation manner, the apparatus further includes an associating module, configured to determine a value of association between each attack source and all the attacked subnets according to $r^s=[(I-aW)^{-1}-I]\bullet b^s$ before the attack sources are sorted, where $r^s$ represents a value of association between one attack source and all the attacked subnets, $b^s$ represents a Boolean vector of an attack relationship between this attack source and all the attacked subnets, s represents an identifier of this attack source, a represents a threat value of this attack source, I represents an identity matrix, and W represents an address of this attack source, where the third generating unit is further configured to for an attacked subnet, use a threat value of each attack source that attacks the subnet and a value of association between each attack source that attacks the subnet and the subnet to determine a danger level imposed by each attack source that attacks the subnet on the subnet, and sort the attack source that attacks the subnet in descending order of the danger level and generate a blacklist corresponding to the subnet.

With reference to the fourth possible implementation manner of the second aspect, in a fifth possible implementation manner, the apparatus further includes a second information collecting module, configured to determine harm information of each subnet before the attack sources are sorted, where the harm information includes the number of attack sources that attack a subnet, the number of attacked ports of this subnet, duration of attack on this subnet, and a sum of amounts of data received by this subnet from all attack sources, and a subnet evaluating module, configured to obtain a vulnerability value according to the harm information of each subnet, where the third generating unit is further configured to for an attacked subnet, use the threat value of each attack source that attacks the subnet, a value of association between each attack source that attacks the subnet and the subnet, and the vulnerability value of the subnet to determine a danger level imposed by each attack source that attacks the subnet on the subnet, and sort the attack source that attacks the subnet in descending order of the danger level and generate a blacklist corresponding to the subnet.

With reference to the possible implementation manners of the second aspect, in a sixth possible implementation manner, the alarm information receiving module is configured to obtain the alarm information from an Openflow asynchronization message sent by the subnet.

In the method and apparatus for improving network security according to the embodiments of the present disclosure, alarm information reported by subnets in a network system after the subnets are attacked may be obtained, an attack source being a relatively high threat may be determined according to the alarm information reported by the subnets, a blacklist may be generated according to a threat level of the attack source, and then the blacklist may be sent to the subnets in the network system so that the subnets can use the blacklist to take corresponding defensive measures against the attack sources recorded in the blacklist. Compared with the prior art in which only an attacked subnet executes a corresponding security policy, and subnets that are not attacked yet, are not notified, the embodiments of the present disclosure can achieve when one or more subnets are attacked, an attack source of this attack is published to other subnets that are not attacked yet in a network system, and an alert is raised in the form of a blacklist, so that the subnets that are not attacked yet in the network system can make defensive preparations against the attack source of this attack. In this way, after an attack source attacks a subnet, even if the same attack source launches an attack on the subnets that are not attacked yet, because other subnets can make defensive preparations, a possibility of being cracked is reduced, and therefore, security of the entire network system is improved.

BRIEF DESCRIPTION OF DRAWINGS

To describe the technical solutions in the embodiments of the present disclosure more clearly, the following briefly introduces the accompanying drawings for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure may be applied to a network system, where the network system includes a control node and at least two subnets connected to the control node.

Figure 1:
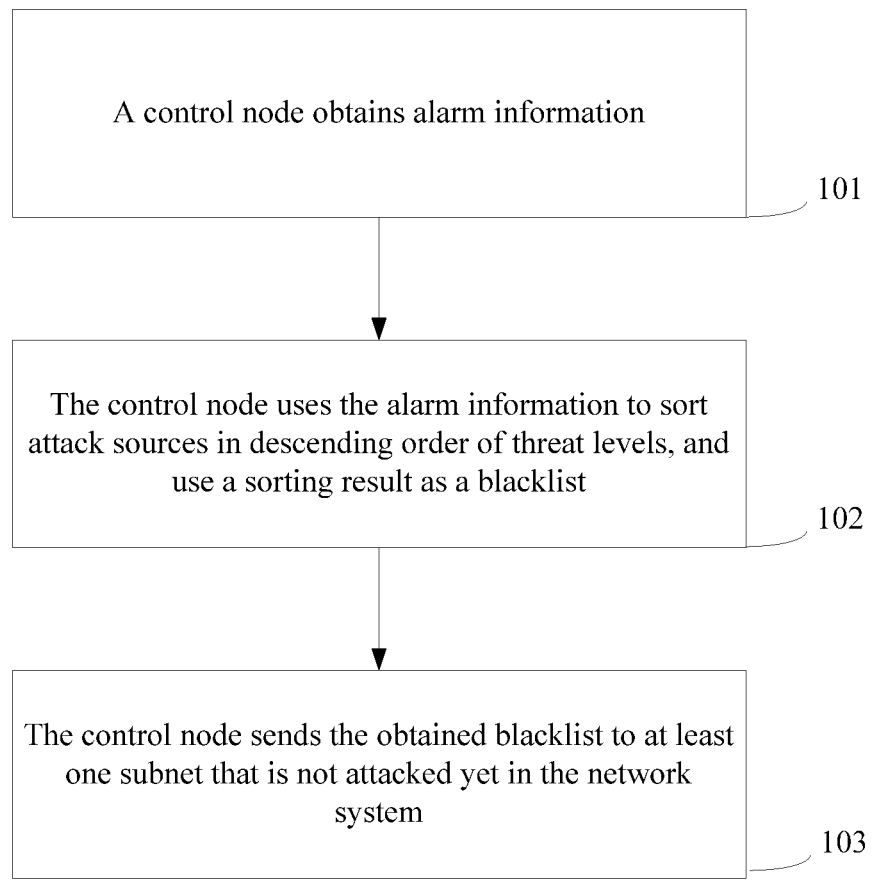
FIG. 1 is a schematic flowchart of a method for improving network security according to an embodiment of the present disclosure.

An embodiment of the present disclosure provides a method for improving network security. As shown in FIG. 1, the method includes the following steps.

101. A control node obtains alarm information.

The alarm information includes address information of an attack source that attacks a subnet of at least two subnets and identification information of the attacked subnet of the at least two subnets. The control node may obtain the alarm information from an Openflow asynchronization message sent by the subnet.

Figure 1A:
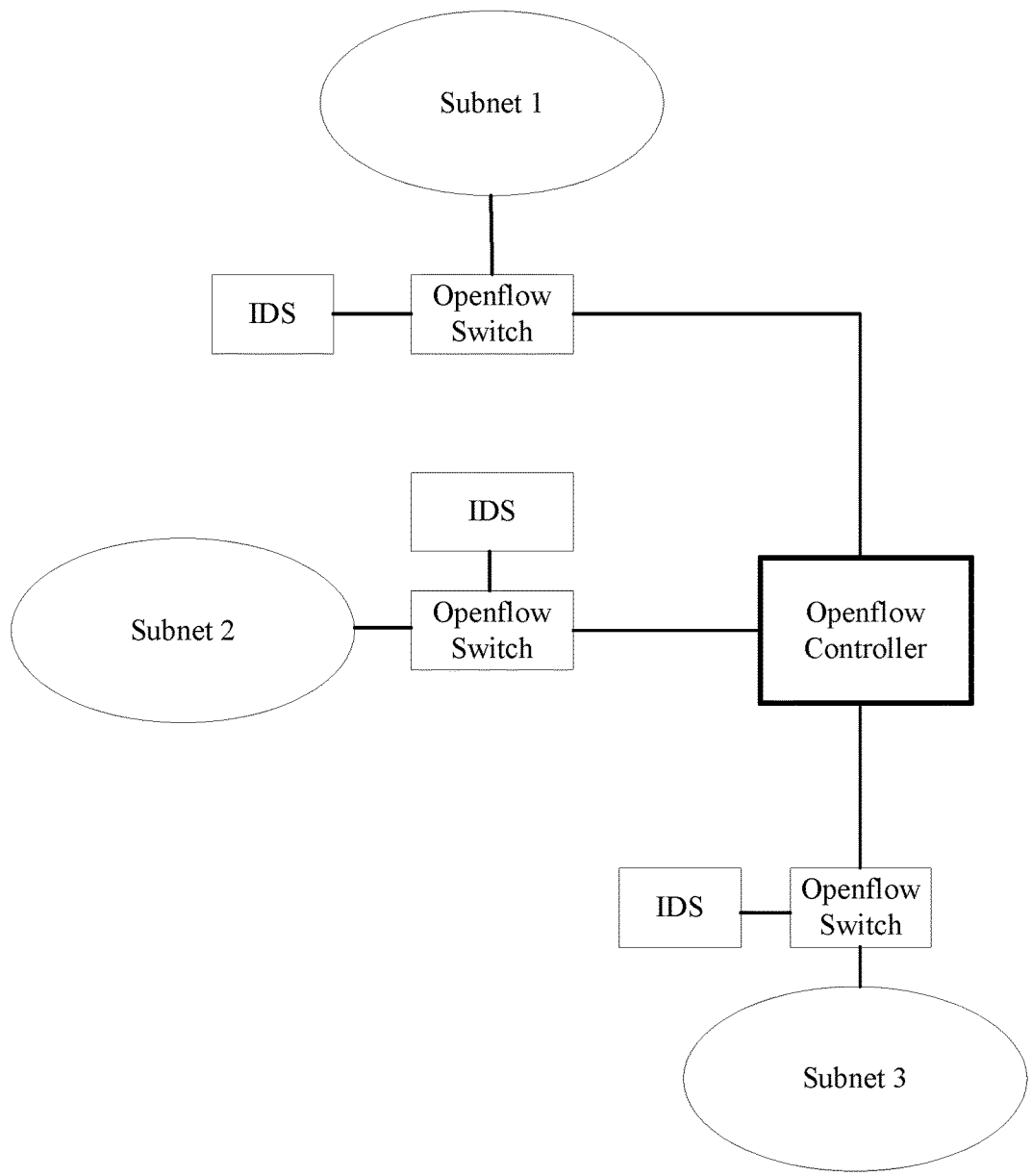
FIG. 1A is a schematic diagram of an example of a network architecture according to an embodiment of the present disclosure.

In this embodiment, the control node may be a device such as a controller or a server in a network system, and the control node may communicate with switches of subnets in the network system. For example, as shown in FIG. 1A, an Openflow Controller that serves as a control node in the network system may exchange data with Openflow Switches of subnets 1, 2 or 3. In addition, the network system may further include a network element device for implementing a defensive function of the network system, such as an intrusion detection system (IDS) and a gateway. When an intrusion detection and defense device of one subnet, such as the IDS, detects that this subnet is attacked, the intrusion detection and defense device may notify a switch of this subnet, such as the Openflow Switch. After receiving a notification from the intrusion detection and defense device, the switch of this subnet may collect address information of an attack source such as an Internet Protocol (IP) address, address information of the attacked subnet, port information of each attacked port in this subnet, and the like. Subsequently, the switch of this subnet may packetize the collected information into alarm information and send the alarm information to a controller in the network system. For example, the Openflow Switch of this subnet may add collected information into an Openflow asynchronization message, where the collected information is the address information of the attack source such as the IP address, the address information of the attacked subnet, and the port information of each attacked port in the subnet and the like, and send the Openflow asynchronization message to the Openflow Controller in the network system. It should be noted that, by using the IDS to use a technical means such as a distributed denial-of-service (DDoS) attack IP tracing and an attack source locating technology, the switch of this subnet may obtain the address information of the attack source.

102. The control node uses the alarm information to sort the attack sources in descending order of threat levels, and uses a sorting result as a blacklist.

In this embodiment, the control node may analyze the alarm information sent by the switch of this subnet, determine threat levels of the attack sources according to an analysis result, then sort the attack sources in descending order of the threat levels, and use the sorting result as the blacklist.

For example, in the network system, the subnets generally have different importance levels. The control node may use the number of attacks launched by an attack source onto an important subnet in a specified time period as an evaluation criterion for evaluating a threat level. According to alarm information reported by the switches of the subnets, the control node may collect statistics on the attacks launched by a certain attack source onto the important subnet in a specific time period. For example, the network system is a data center network of an operator, and the data center network includes three subnets: a subnet 1, a subnet 2, and a subnet 3. The subnet 3 provides services such as a WEB service and an Email service, and relates to commercial benefits of the operator, but the subnet 1 and the subnet 2 are primarily used for testing, and relate to few commercial benefits of the operator. Therefore, an importance level of the subnet 3 is higher than that of the subnet 1 and the subnet 2. Within one hour, a switch of the subnet 1 reports alarm information to a control node for 10 times, where nine pieces of alarm information include address information of an attack source A, four pieces of alarm information include address information of an attack source B, and one piece of alarm information includes address information of an attack source C. A switch of the subnet 2 reports alarm information to the control node for five times, where five pieces of alarm information include the address information of the attack source A, three pieces of alarm information include the address information of the attack source B, and two pieces of alarm information include the address information of the attack source C. A switch of the subnet 3 reports alarm information to the control node twice, where one piece of alarm information includes the address information of the attack source A, two pieces of alarm information include the address information of the attack source B, and no alarm information includes the address information of the attack source C. The control node may collect statistics that, within one hour, the attack source A launches attacks on the subnet 3 for 16 times in total, the attack source B launches attacks on all the subnets in the network system for eight times in total, and the attack source C launches attacks on all the subnets in the network system for three times in total so that a blacklist shown in Table 1 may be obtained.

TABLE 1

| Sequence number | Attack source address | Number of attacks on the subnet 3/h |
| --- | --- | --- |
| 1 | 192.168.4.111 (attack source B) | 2 |
| 2 | 192.168.4.283 (attack source A) | 1 |
| 3 | 192.168.4.132 (attack source C) | 0 |

In the table given above, a smaller sequence number indicates a higher threat level of the attack source.

103. The control node sends the obtained blacklist to at least one subnet that is not attacked yet in the network system.

In this embodiment, the control node may send the obtained blacklist to the switches of the subnets so that the switches of the subnets use the received blacklist and use multiple technical means to defend against network attacks launched by the attack sources included in the blacklist. For example, after receiving the blacklist, the switches of the subnets may disable address information of the attack sources that rank in the first several places (for example, the first 2 places, the first 3 places, the first 4 places, and the like), and stop receiving packets from the attack sources. For another example, after receiving the blacklist, the switches of the subnets may further deliver the blacklist to each network element in the subnets. According to the blacklist, each network element in the subnets may use defensive tools such as antivirus software and a firewall to use defensive technical means to the packets from the attack sources shown in the blacklist, where the technical means is scanning and removing data, intercepting APP messages from the attack sources, and the like.

In the method for improving network security according to this embodiment of the present disclosure, the alarm information reported by the subnets in the network system after the subnets are attacked may be obtained, an attack source being a relatively high threat may be determined according to the alarm information reported by the subnets, the blacklist may be generated according to a threat level of the attack source, and the blacklist may be sent to the subnets in the network system so that the subnets may use the blacklist to take corresponding defensive measures to defend against the attack sources recorded in the blacklist. Compared with the prior art in which only an attacked subnet executes a corresponding security policy, and subnets that are not attacked yet are not notified, this embodiment of the present disclosure can achieve, when one subnet is attacked, an attack source of this attack is published to subnets that are not attacked yet in a network system and an alert is raised in the form of a blacklist so that the subnets that are not attacked yet in the network system may make defensive preparations against the attack source of this attack. In this way, after an attack source attacks a subnet, even if the same attack source launches an attack on the subnets that are not attacked yet, because other subnets may make defensive preparations, a possibility of being cracked is reduced, and therefore, security of the entire network system is improved.

Optionally, in the solution shown in FIG. 1, there may be multiple implementation manners of sorting the attack sources in 102. For example, in a solution shown in FIG. 2A, 102 may include the following.

1021*a*. Use the identification information of the attacked subnet to determine the number of subnets attacked by each attack source of multiple attack sources corresponding to the address information of the attack sources.

For example, according to the alarm information reported by the switches of the subnets, the control node may collect statistics on the number of attacks launched in a specific time period by a certain attack source onto the entire network system. For example, the network system includes three subnets: a subnet 1, a subnet 2, and a subnet 3, and each subnet can communicate with the control node by using a switch. The control node may use the number of attacks launched by an attack source onto the network system in a specified time period as an evaluation criterion for evaluating a threat level. For example, within one hour, a switch of the subnet 1 reports alarm information to the control node for 10 times, where nine pieces of alarm information include address information of an attack source A, four pieces of alarm information include address information of an attack source B, and one piece of alarm information includes address information of an attack source C. A switch of the subnet 2 reports alarm information to the control node for five times, where five pieces of alarm information include the address information of the attack source A, three pieces of alarm information include the address information of the attack source B, and two pieces of alarm information include the address information of the attack source C. A switch of the subnet 3 reports alarm information to the control node twice, where two piece of alarm information includes the address information of the attack source A, one piece of alarm information include the address information of the attack source B, and no alarm information includes the address information of the attack source C; and the control node may collect statistics that, within one hour, the attack source A launches attacks on all the subnets in the network system for 16 times in total, the attack source B launches attacks on all the subnets in the network system for eight times in total, and the attack source C launches attacks on all the subnets in the network system for three times in total so that a blacklist shown in Table 2 may be obtained.

TABLE 2

| Sequence number | Attack source address | Number of attacks/h |
|---|---|---|
| 1 | 192.168.4.283 (attack source A) | 16 |
| 2 | 192.168.4.111 (attack source B) | 8 |
| 3 | 192.168.4.132 (attack source C) | 3 |

In the table given above, a smaller sequence number indicates a higher threat level of the attack source.

1022a. Sort each attack source in descending order of the number of the attacked subnets.

For example, in a specific example of 1021a, the sorting result is: the attack source A-the attack source B-the attack source C, and the control node may send the sorting result as a blacklist to each subnet.

In the method for improving network security according to this embodiment of the present disclosure, the alarm information reported by the subnets in the network system after the subnets are attacked may be obtained, an attack source being a relatively high threat may be determined according to the number of subnets attacked by attack sources, a blacklist may be generated according to a threat level of the attack source, and then the blacklist may be sent to the subnets in the network system so that the subnets may use the blacklist to take corresponding defensive measures, especially to defend against the attack sources that attack the network system frequently as recorded in the blacklist, where the frequently attacking attack sources are generally attack sources that impose a high threat level and need to be especially prevented. Compared with the prior art in which only an attacked subnet executes a corresponding security policy, and subnets that are not attacked yet are not notified, this embodiment of the present disclosure can achieve, when one subnet is attacked, an attack source of this attack is published to subnets that are not attacked yet in a network system and an alert is raised in the form of a blacklist so that the subnets that are not attacked yet in the network system may make defensive preparations against frequent attacks on the network system. In this way, after an attack source being a relatively high threat attacks a subnet, even if the attack source launches an attack on the subnets that are not attacked yet, because other subnets may make defensive preparations against the attack sources of a relatively high threat level, a possibility of being cracked by the attack sources of a relatively high threat level is further reduced. Therefore, security of the entire network system is improved.

Figure 2A:
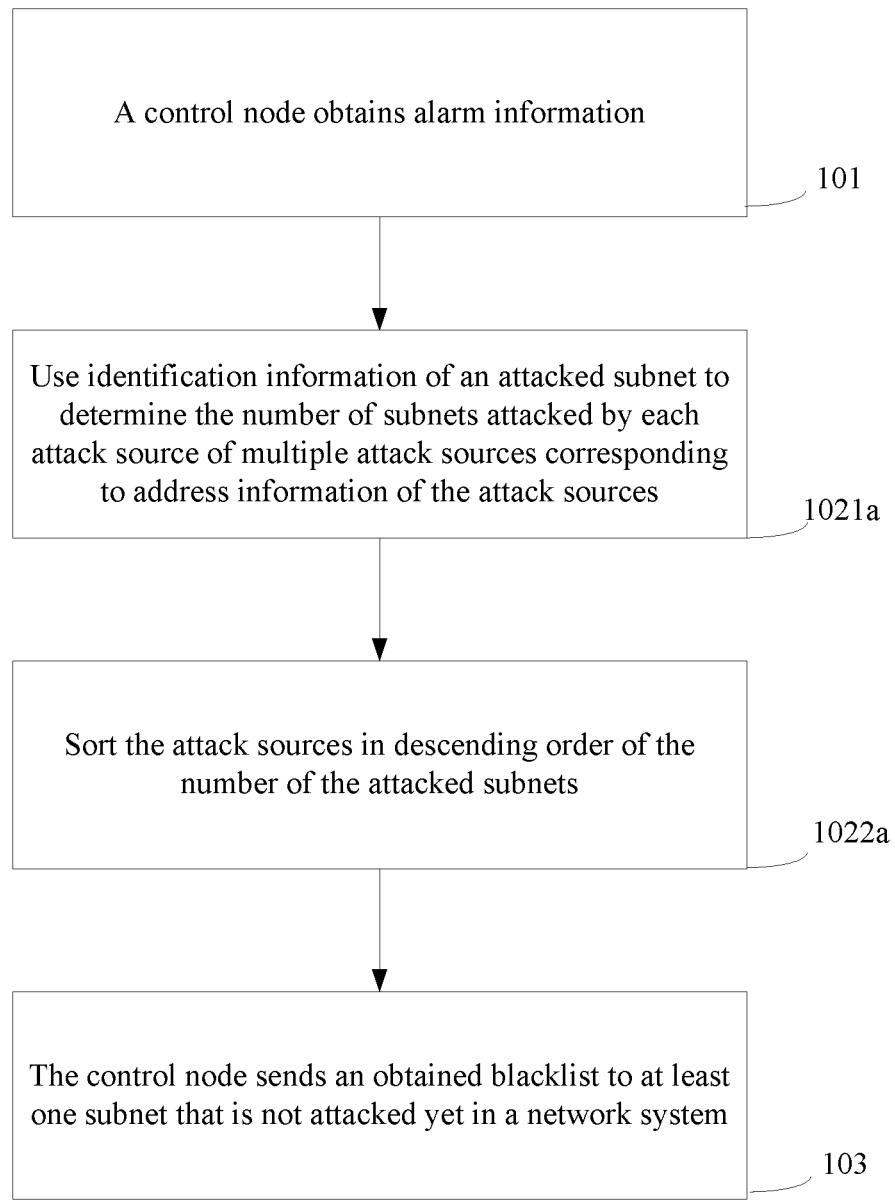
FIG. 2A is a schematic flowchart of a specific implementation manner of a method for improving network security according to an embodiment of the present disclosure.
Figure 2B:
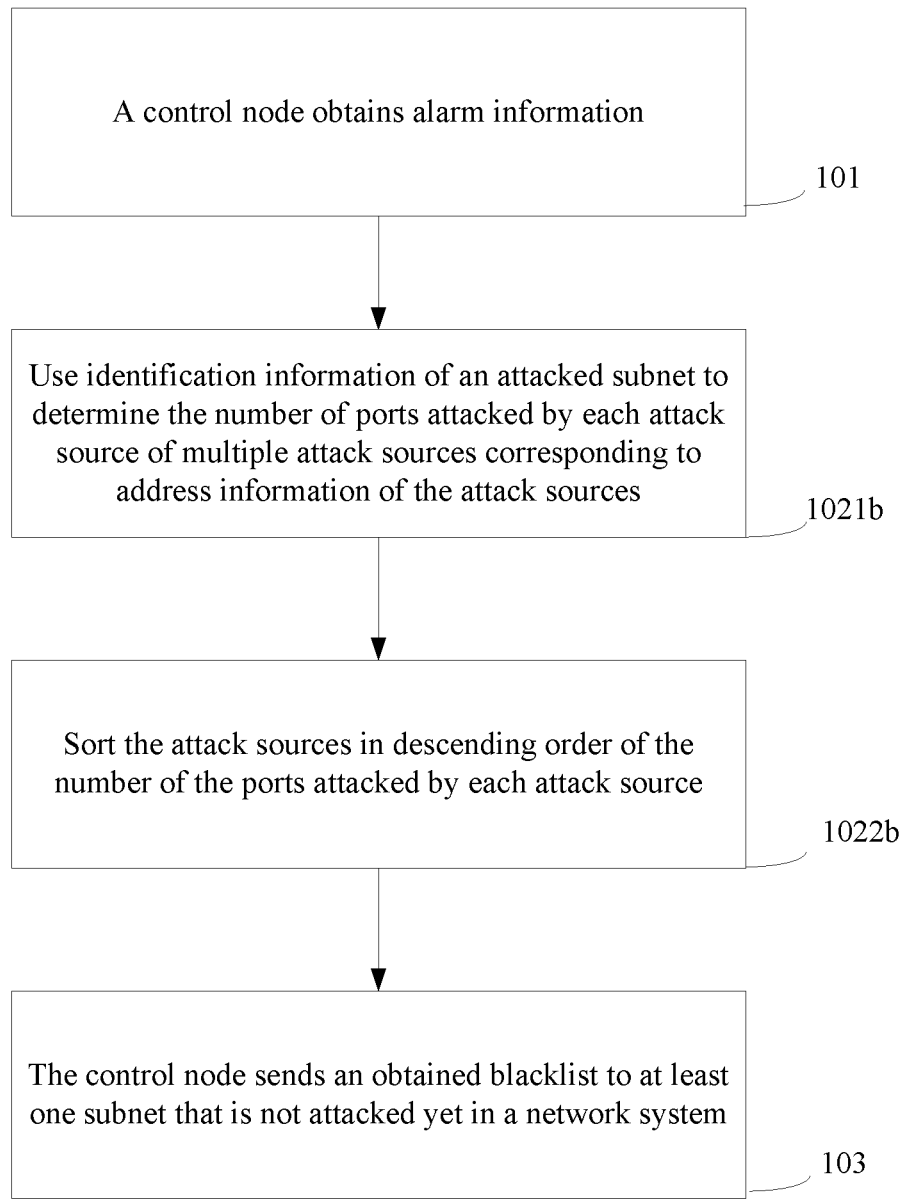
FIG. 2B is a schematic flowchart of another specific implementation manner of a method for improving network security according to an embodiment of the present disclosure.

Alternatively, in the solution shown in FIG. 1, the implementation manner of sorting the attack sources may also be implemented according to a solution shown in FIG. 2B, where 102 may include the following.

1021b. Use the identification information of the attacked subnet to determine the number of ports attacked by each attack source of multiple attack sources corresponding to the address information of the attack sources.

The ports attacked by the attack sources may be physical ports, logical interfaces or protocol ports in the network system. For example, the control node may monitor physical ports such as a hub, a switch, and a router in the network system, determine an attack source by analyzing a source address of a packet used to attack the physical ports, and collect statistics on the number of physical ports attacked by each attack source, for example, obtain the number of attacks on each port by the attack sources, as shown in Table 3.

TABLE 3

| | Attack source A | Attack source B | Attack source C |
|---|---|---|---|
| Switch 1 | 1 | 5 | 6 |
| Switch 2 | 3 | 5 | 2 |
| Router | 2 | 5 | 1 |

In the table given above, the attack source A attacks the switch 1 once, attacks the switch 2 for three times, and attacks the router twice. The attack source B attacks the switch 1 for five times, attacks the switch 2 for five times, and attacks the router for five times. The attack source C attacks the switch 1 for six times, attacks the switch 2 for three times, and attacks the router once. According to the numbers of attacks on physical ports, the control node may obtain a blacklist: the attack source B-the attack source C-the attack source A.

Similarly, the control node may monitor information about attacks, launched by attack sources, on a device that bears a logical interface, and determine a blacklist, or monitor information about attacks, launched by attack sources, on devices that use a same protocol port, and determine a blacklist.

1022b. Sort each attack source in descending order of the number of the ports attacked by each attack source.

From the perspective of an actual application, when launching an attack on a network system, an attack source generally takes each port in the network system as a direct attack object. Therefore, the number of ports, attacked by the attack source, in the network system may also be used as a parameter for analyzing the threat level of the attack source. A larger number of the ports attacked by the attack source in a specific time period indicates a more dangerous attack source.

In the method for improving network security according to this embodiment of the present disclosure, the alarm information reported by the subnets in the network system after the subnets are attacked may be obtained, an attack source being a relatively high threat may be determined according to the number of ports attacked by attack sources, a blacklist may be generated according to a threat level of the attack source. Then the blacklist may be sent to the subnets in the network system so that the subnets may use the blacklist to take corresponding defensive measures, especially to defend against the attack sources that attack the network system frequently as recorded in the blacklist, where the frequently attacking attack sources are generally attack sources that impose a high threat level and need to be especially prevented. Compared with the prior art in which only an attacked subnet executes a corresponding security policy, and subnets that are not attacked yet are not notified, this embodiment of the present disclosure can achieve, when one subnet is attacked, an attack source of this attack is published to subnets that are not attacked yet in a network system, and an alert is raised in the form of a blacklist so that the subnets that are not attacked yet in the network system may make defensive preparations against frequent attacks on the network system. In this way, after an attack source being a relatively high threat attacks a subnet, even if the attack source launches an attack on the subnets that are not attacked yet, because other subnets may make defensive preparations against the attack sources of a relatively high threat level, a possibility of being cracked by the attack sources of a relatively high threat level is further reduced, and therefore, security of the entire network system is improved.

Figure 2C:
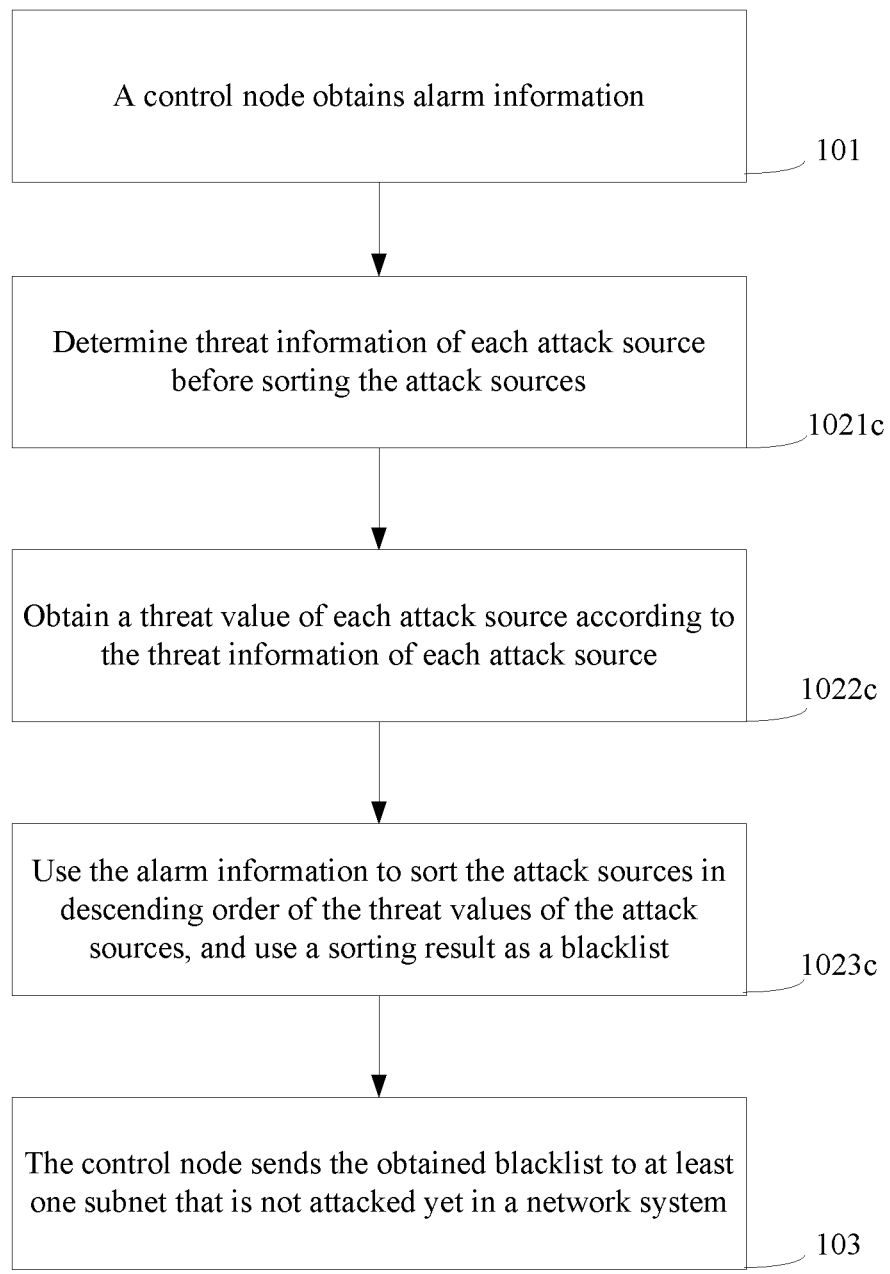
FIG. 2C is a schematic flowchart of still another specific implementation manner of a method for improving network security according to an embodiment of the present disclosure.

Alternatively, 102 may also be implemented according to the solution shown in FIG. 2C, which may include the following.

1021c. Determine threat information of each attack source before sorting the attack sources.

The threat information includes duration of an attack launched by this attack source, an amount of data from this attack source, the number of subnets attacked by this attack source, and the number of ports attacked by this attack source.

In this embodiment, the control node may also determine the threat level of the attack source according to multiple parameters such as the duration of the attack launched by the attack source, the amount of data from the attack source, the number of subnets attacked by the attack source, and the number of ports attacked by the attack source. For different types of parameters for determining the threat level of the attack source, the control node may use standardized calculation manners such as weighted summation, and obtain a standardized calculation result corresponding to each attack source. The control node may use the standardized calculation result of the attack source as quantized data that reflects the threat level of the attack source, sort the attack sources in descending order of the standardized calculation results, and use a sorting result as a blacklist.

1022c. Obtain a threat value of each attack source according to the threat information of the attack source.

For example, according to the alarm information reported by the subnets, the control node learns that the duration of the attack launched by the attack source A is 600 s, the amount of data from the attack source A is 21M, the number of subnets, attacked by the attack source A, in the network system is 8, and the number of physical ports attacked by the attack source A is 21. Weight values of the four parameters in standardized calculation are $A_1$, $A_2$, $A_3$, and $A_4$, respectively.

Therefore, the threat value=$600*A_1+21*A_2+8*A_3+21*A_4$.

1023c. Use the alarm information to sort the attack sources in descending order of the threat values of the attack sources, and use a sorting result as a blacklist.

In the method for improving network security according to this embodiment of the present disclosure, the alarm information reported by the subnets in the network system after the subnets are attacked may be obtained, an attack source being a relatively high threat may be comprehensively evaluated according to multiple parameters in the threat information of the attack source, a blacklist may be generated according to the threat level of the attack source, and the blacklist may be sent to the subnets in the network system so that the subnets may use the blacklist to take corresponding defensive measures, to defend against the attack sources recorded in the blacklist. Compared with the prior art in which only an attacked subnet executes a corresponding security policy, and subnets that are not attacked yet are not notified, this embodiment of the present disclosure can achieve, when one subnet is attacked, an attack source of this attack is published to subnets that are not attacked yet in a network system, and an alert is raised in the form of a blacklist so that the subnets that are not attacked yet in the network system may make defensive preparations against the attack source of this attack. In this way, after an attack source attacks a subnet, even if the same attack source launches an attack on the subnets that are not attacked yet, because other subnets may make defensive preparations, a possibility of being cracked is reduced. Therefore, security of the entire network system is improved.

Figure 3A:
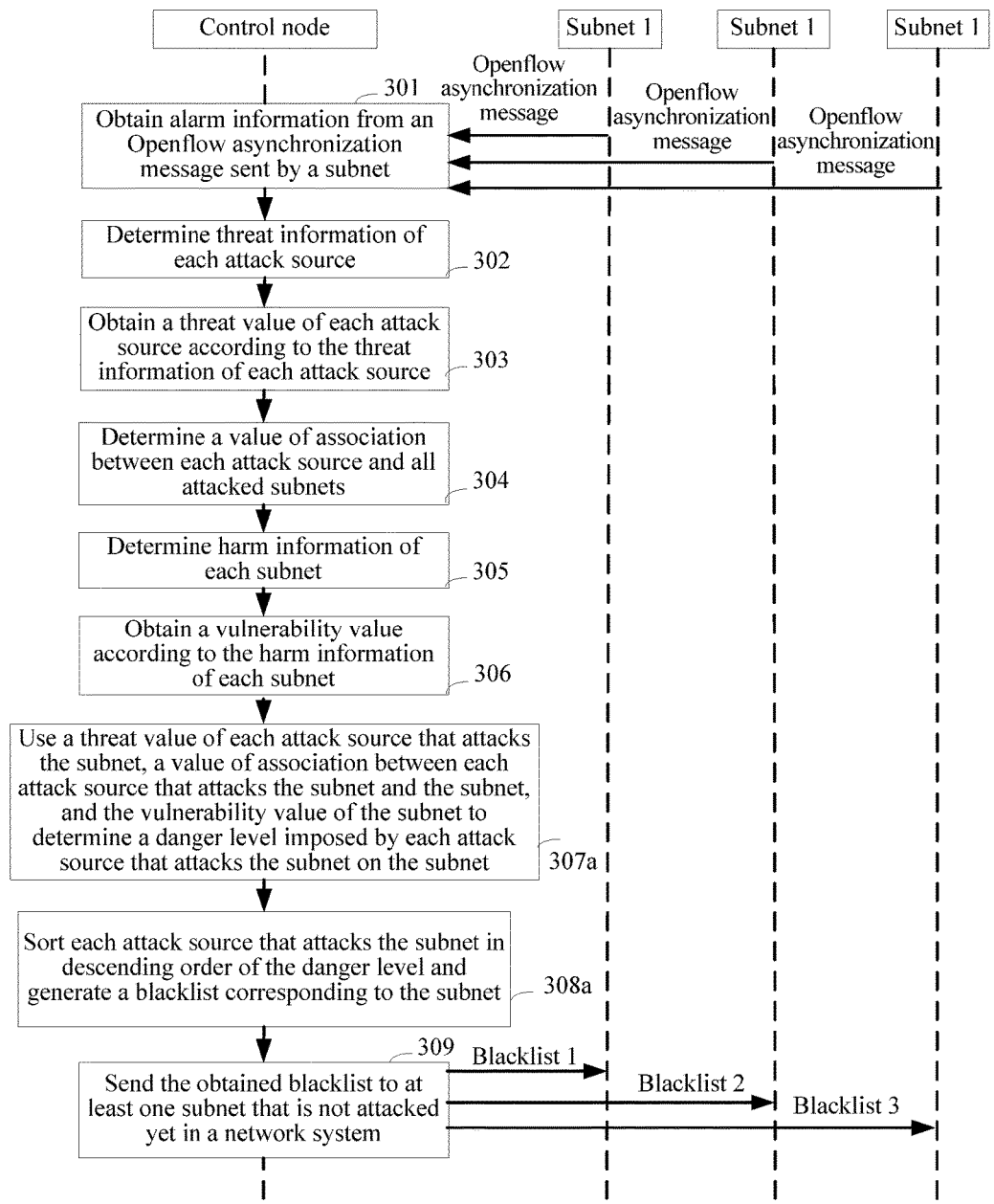
FIG. 3A is a schematic diagram of an information exchange process of a method for improving network security according to an embodiment of the present disclosure.

In this embodiment, the control node may generate a blacklist according to the information about attacks on the network system by means of the specific implementation manners in FIG. 2A, FIG. 2B, and FIG. 2C, and send the generated blacklist to all subnets. The control node may also generate a different blacklist for each subnet so that the blacklist of one subnet can further adapt to characteristics or network security conditions of the subnet so as to implement individualized defense for different subnets in the network system. Therefore, an embodiment of the present disclosure further provides a solution shown in FIG. 3A, where the solution includes the following.

301. The control node obtains the alarm information from an Openflow asynchronization message sent by the subnet.

The alarm information includes address information of an attack source that attacks a subnet of the at least two subnets and identification information of the attacked subnet of the at least two subnets.

302. Determine threat information of each attack source.

The threat information includes duration of an attack launched by this attack source, an amount of data from this attack source, the number of subnets attacked by this attack source, and the number of ports attacked by this attack source.

303. Obtain a threat value of each attack source according to the threat information of the attack source.

A control node may perform standardized calculation for threat information of each attack source, and use an obtained result as a threat value. For example, the control node may perform weighted summation for parameters such as duration of attacks launched by one attack source, an amount of data from this attack source, the number of subnets attacked by this attack source, and the number of ports attacked by this attack source, and use a result of the weighted summation as the threat value.

304. Determine a value of association between each attack source and all attacked subnets according to $r^s=[(I-aW)^{-1}-I]\bullet b^2$.

In the foregoing formula, $r^s$ represents the value of association between one attack source and all the attacked subnets; $b^s$ represents a Boolean vector of an attack relationship between this attack source and all the attacked subnets; s represents an identifier of this attack source, a represents a threat value of this attack source, I represents an identity matrix, and W represents an address of this attack source.

In $b^s$, a value of each element is 0 or 1 depending on the attack relationship. For example, $b^s$ is a column vector, and each element being 0 or 1 indicates whether an attack source (or an attacker, that is, an IP address) s has attacked a corresponding network. For example, an example of $b^s$ may be:

| | |
|---|---|
| 1 | indicates that s has attacked a network 1 |
| 0 | indicates that s has not attacked a network 2 |
| 0 | indicates that s has not attacked a network 3 |
| 1 | indicates that s has attacked a network 4 |
| 0 | indicates that s has not attacked a network 5 |
| 0 | indicates that s has not attacked a network 6 |
| 1 | indicates that s has attacked a network 7 |
| 0 | indicates that s has not attacked a network 8 |

In this embodiment, a value of a may be $0<a<1$, and a value of an L2 normal form (Frobenius normal form) of a matrix aW is less than 1. A process in which the control node calculates and obtains a may be the following.

Assuming that $$W = \begin{pmatrix} 0.1 & 0.3 \\ 0.3 & 0.4 \end{pmatrix},$$

hence $$aW = \begin{pmatrix} 0.1a & 0.3a \\ 0.3a & 0.4a \end{pmatrix},$$

which requires that the L2 normal form of the matrix aW should be less than 1.

Therefore, $\sqrt{(0.1a)^2+(0.3a)^2+(0.3)^2+(0.4a)^2}<1$, which is simplified into $0.5916a<1$, that is, $a<1.69$. Because a condition 1 stipulates that the value of a is between 0 and 1, after an intersection set is obtained, the value of a may be any value between 0 and 1. W may be an n*n symmetric matrix, n is the number of monitored subnets, a value range of each element of W is [0, 1], $W_{ij}$ represents a cosine distance between "a source IP set of an attack source i" and "a source IP set of an attack source j", that is, $$W_{ij} = \frac{|Attacker_i \cap Attacker_j|^2}{|Attacker_i| \cdot |Attacker_j|},$$

where $Attacker_i$ represents "a source IP set of the attack source i," and $Attacker_j$ represents "a source IP set of the attack source j." For example, $Attacker_i=\{192.168.1.10, 192.168.1.21, 192.168.1.34\}$, $Attacker_j=\{192.168.1.11, 192.168.1.21, 192.168.1.168\}$, and therefore, $|Attacker_i \cap Attacker_j|=|\{192.168.1.21\}|=1$, that is, only one IP address exists in a result of $|Attacker_i \cap Attacker_j|$, and $|Attacker_i| \cdot |Attacker_j|=3 \times 3=9$ Finally, $$W_{ij} = \frac{1}{9}.$$

Assuming that $$W = \begin{pmatrix} 0.1 & 0.3 \\ 0.3 & 0.4 \end{pmatrix},$$

it indicates that there are two networks in total, and the meaning of each element is as follows:

|  | Network 1 | Network 2 |
| --- | --- | --- |
| Network 1 | $W_{11} = 0.1$ | $W_{12} = 0.3$ |
| Network 2 | $W_{21} = 0.3$ | $W_{22} = 0.4$ |

305. Determine harm information of each subnet.

Harm information of a subnet may include the number of attack sources that attack a subnet, the number of attacked ports of this subnet, duration of attack on this subnet, and a sum of amounts of data received by this subnet from all attack sources.

306. Obtain a vulnerability value according to the harm information of each subnet.

The control node may perform standardized calculation according to the harm information of the subnet, and use a result of the standardized calculation as the vulnerability value.

In this embodiment, after determining the threat information of each attack source, the control node may simultaneously perform 303-304 and 305-306, and may also perform them in a specified order.

307a. For an attacked subnet, use a threat value of each attack source that attacks the subnet, a value of association between each attack source that attacks the subnet and the subnet, and the vulnerability value of the subnet to determine a danger level imposed by each attack source that attacks the subnet on the subnet.

For an attacked subnet, the control node may perform the foregoing steps to obtain the threat value of each attack source that has attacked the subnet, and a value of association between each attack source that has attacked the subnet and the subnet, and the vulnerability value of the subnet. For example, attack sources that have attacked a subnet 1 include an attack source A, an attack source B, an attack source C, and an attack source D. For the attack source A, the control node may obtain three parameters: a threat value of the attack source A, a value of association between the attack source A and the subnet 1, and a vulnerability value of the subnet 1, perform a weighted summation calculation or a weighted averaging calculation for the three parameters, and use an obtained result of the weighted calculation as a quantized parameter that reflects the threat level imposed by the attack source A on the subnet 1. Similarly, the control node may obtain a result of the weighted calculation of the attack source B, a result of the weighted calculation of the attack source C, and a result of the weighted calculation of the attack source D, and sort the attack source A, the attack source B, the attack source C, and the attack source D in descending order of the results of the weighted calculation of the attack source A, the attack source B, the attack source C, and the attack source D, so as to obtain a blacklist 1 for the subnet 1. Similarly, a blacklist 2 and a blacklist 3 for the subnet 2 and the subnet 3 may be obtained, and the like.

308a. Sort each attack source that attacks the subnet in descending order of the danger level and generate a blacklist corresponding to the subnet.

Alternatively, in this embodiment, when generating the blacklist for the attacked subnet, the control node may use only the threat value of each attack source has attacked the subnet, and the value of association between each attack source has attacked the subnet and the subnet to determine a danger level imposed by each attack source has attacked the subnet on the subnet. Therefore, on the basis of the solution shown in FIG. 3A, an embodiment of the present disclosure further provides an implementation manner shown in FIG. 3B, which further includes the following.

307b. For an attacked subnet, use the threat value of each attack source that attacks the subnet and a value of association between each attack source that attacks the subnet and the subnet to determine a danger level imposed by each attack source that attacks the subnet on the subnet.

308b. Sort each attack source that attacks the subnet in descending order of the danger level and generate a blacklist corresponding to the subnet.

Figure 3B:
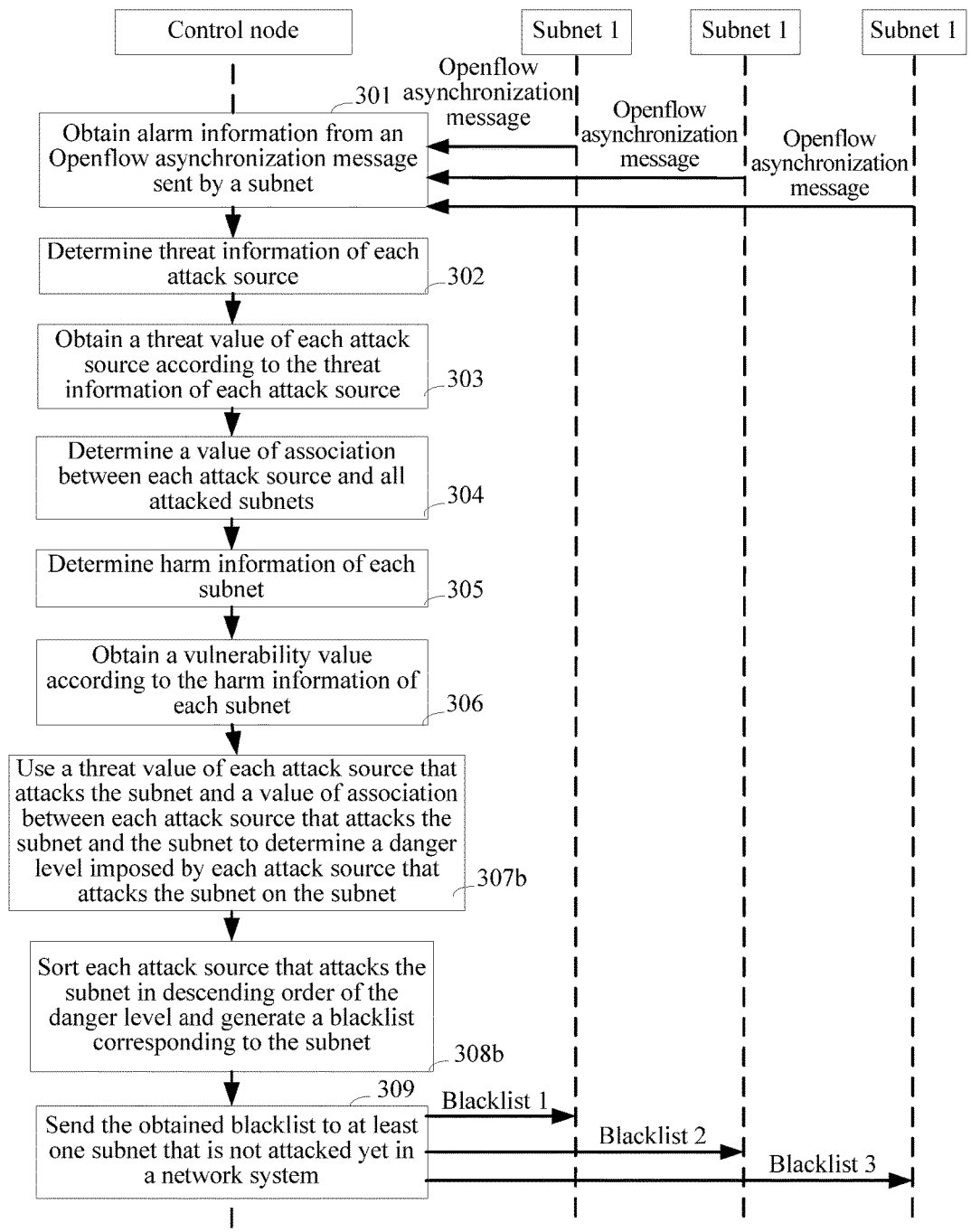
FIG. 3B is a schematic diagram of another information exchange process of a method for improving network security according to an embodiment of the present disclosure.

In the solution shown in FIG. 3B, because the vulnerability value of the subnet may not be used to determine the parameter that reflects the danger level imposed by an attack source on a subnet, in the implementation manner shown in FIG. 3B, the process of 305-306 may not be included.

In an actual application of this embodiment, the vulnerability value of the subnet may not be used as a parameter for generating the blacklist. In many cases, when the network system receives frequent attacks, the control node needs to generate and publish the blacklist quickly so as to quickly publish an attack source being a high threat to each subnet in the network system. Therefore, the vulnerability value of the subnet may not be used as a parameter when the blacklist is generated, which omits the process of 305-306, thereby increasing efficiency of the control node in generating the blacklist.

309. The control node sends the obtained blacklist to at least one subnet that is not attacked yet in the network system.

In the method for improving network security according to this embodiment of the present disclosure, alarm information reported by subnets in a network system after the subnets are attacked may be obtained, a blacklist may be generated specially for a subnet according to information about an attack launched by each attack source in the subnet, where the blacklist further adapts to characteristics or network security conditions of the subnet, and the blacklist records an attack source being a high threat to the subnet. In this way, the subnet may use the blacklist to take corresponding defensive measures, individualized defense may be performed for different subnets in the network system, and the subnet can more efficiently defend against the attack source recorded in the blacklist. Compared with the prior art in which only an attacked subnet executes a corresponding security policy, and subnets that are not attacked yet are not notified, this embodiment of the present disclosure can achieve, when one subnet is attacked, an attack source of this attack is published to subnets that are not attacked yet in a network system, and an alert is raised in the form of a blacklist, so that the subnets that are not attacked yet in the network system may make defensive preparations against the attack source of this attack. In this way, after an attack source attacks a subnet, even if the same attack source launches an attack on the subnets that are not attacked yet, because other subnets may make defensive preparations, a possibility of being cracked is reduced, and therefore, security of the entire network system is improved.

Figure 4:
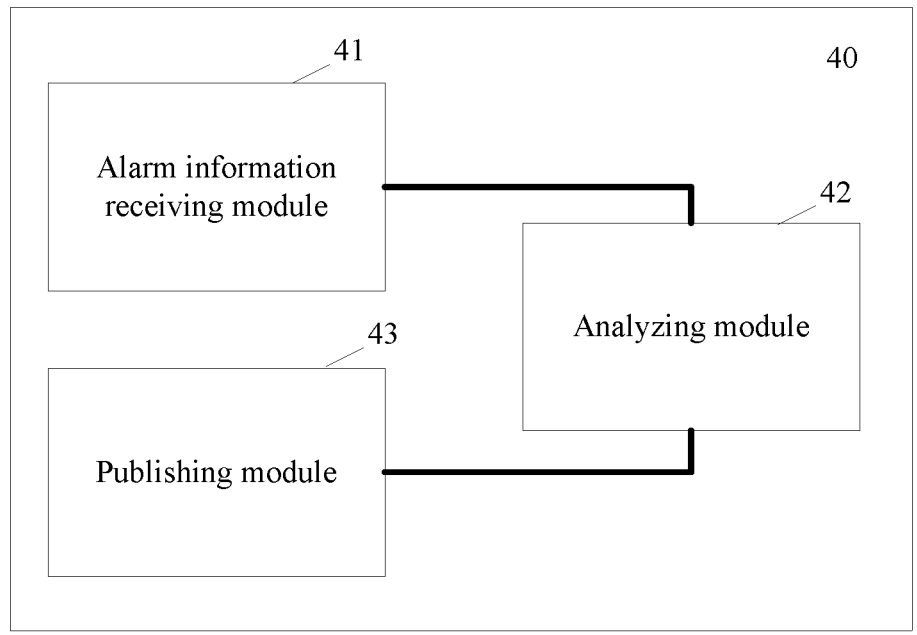
FIG. 4 is a schematic structural diagram of an apparatus for improving network security according to an embodiment of the present disclosure.

An embodiment of the present disclosure provides an apparatus 40 for improving network security. As shown in FIG. 4, the apparatus includes an alarm information receiving module 41 configured to obtain alarm information, wherein the alarm information includes address information of attack sources that attack a subnet of at least two subnets and identification information of the attacked subnet of the at least two subnets. A network system includes a control node and at least two subnets in communication connection with the control node. An analyzing module 42 is configured to use the alarm information to sort the attack sources in descending order of threat levels, and use a sorting result as a blacklist. A publishing module 43 is configured to send the obtained blacklist to at least one subnet that is not attacked yet in the network system.

Figure 5:
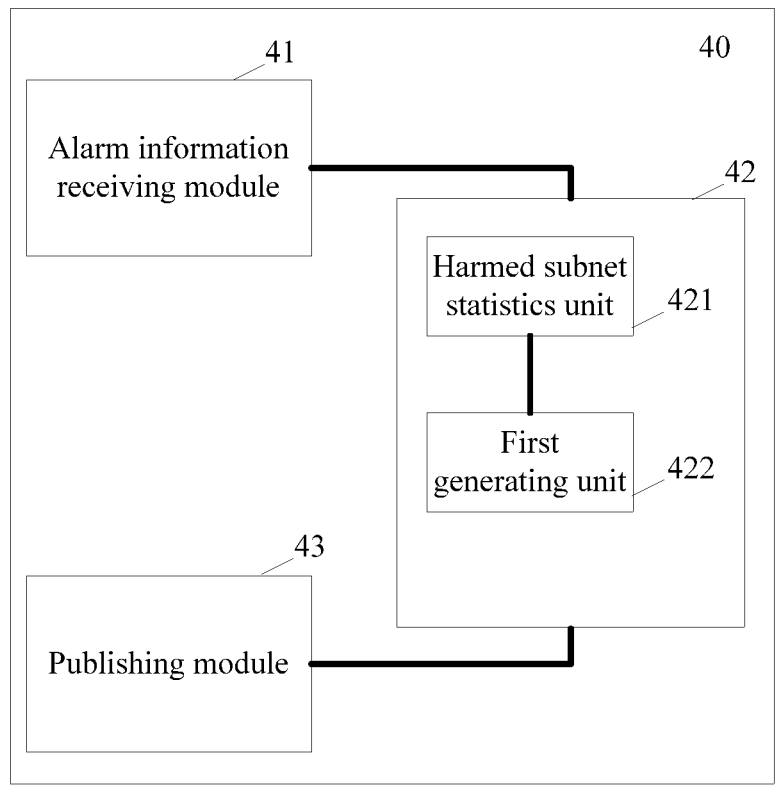
FIG. 5, FIG. 6, FIG. 7, FIG. 8 and FIG. 9 are a schematic structural diagram of a specific implementation manner of an apparatus for improving network security according to an embodiment of the present disclosure.

Optionally, as shown in FIG. 5, the analyzing module 42 may include a harmed subnet statistics unit 421 configured to use the identification information of the attacked subnet to determine the number of subnets attacked by each attack source of multiple attack sources corresponding to the address information of the attack sources, and a first generating unit 422 configured to sort the attack sources in descending order of the number of the attacked subnets.

Figure 6:
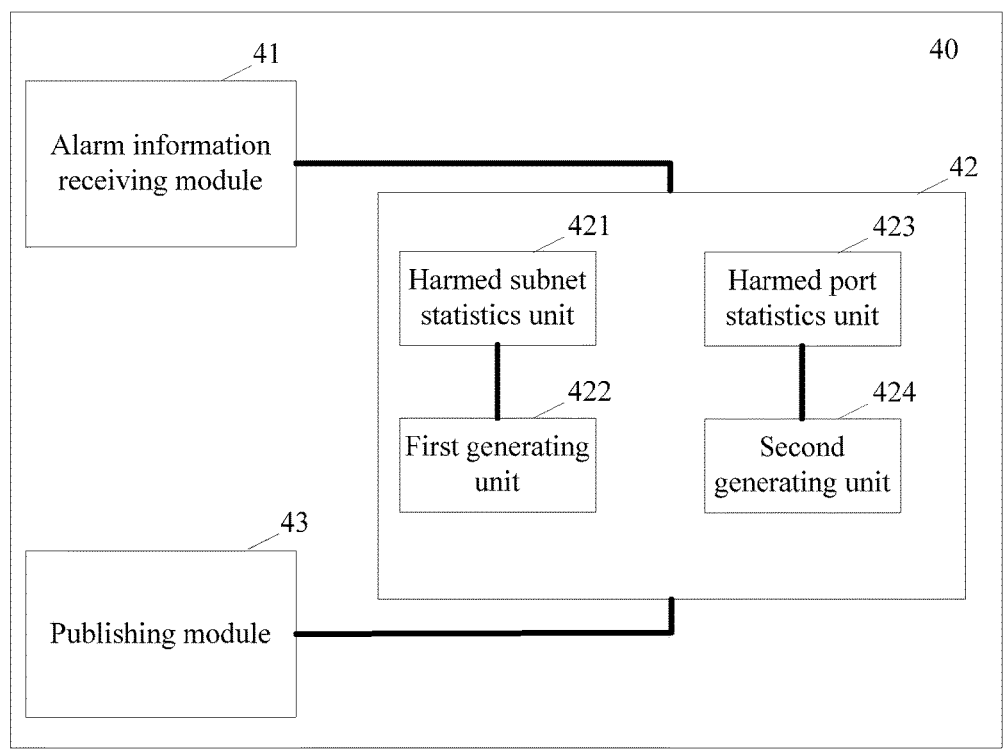

Further, optionally, as shown in FIG. 6, the analyzing module 42 may further include a harmed port statistics unit 423 configured to use the identification information of the attacked subnet to determine the number of ports attacked by each attack source of multiple attack sources corresponding to the address information of the attack sources, and a second generating unit 424 configured to sort the attack sources in descending order of the number of the ports attacked by each attack source.

Figure 7:
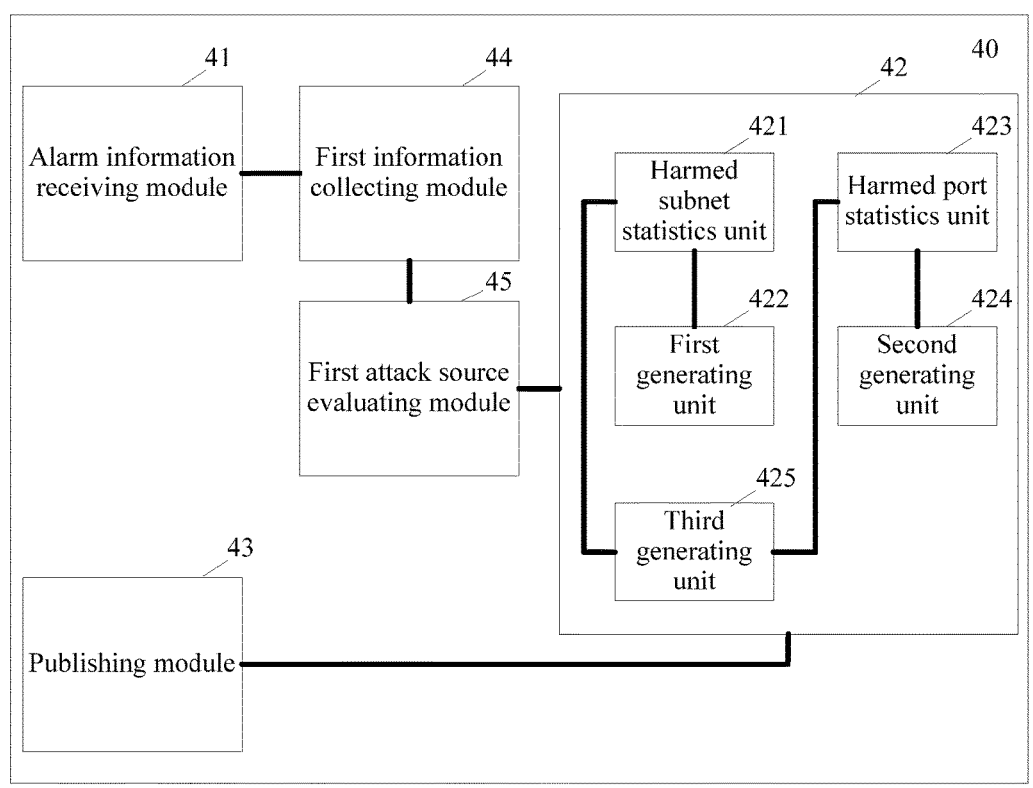

Further, as shown in FIG. 7, the apparatus 40 may further include a first information collecting module 44 configured to determine threat information of each attack source before the attack sources are sorted, where the threat information includes duration of an attack launched by the attack source, an amount of data from the attack source, the number of subnets attacked by the attack source, and the number of ports attacked by the attack source, and a first attack source evaluating module 45 configured to obtain a threat value of each attack source according to the threat information of the attack source, where the analyzing module 42 further includes a third generating unit 425 configured to use the alarm information to sort the attack sources in descending order of the threat values of the attack sources, and use a sorting result as a blacklist.

Figure 8:
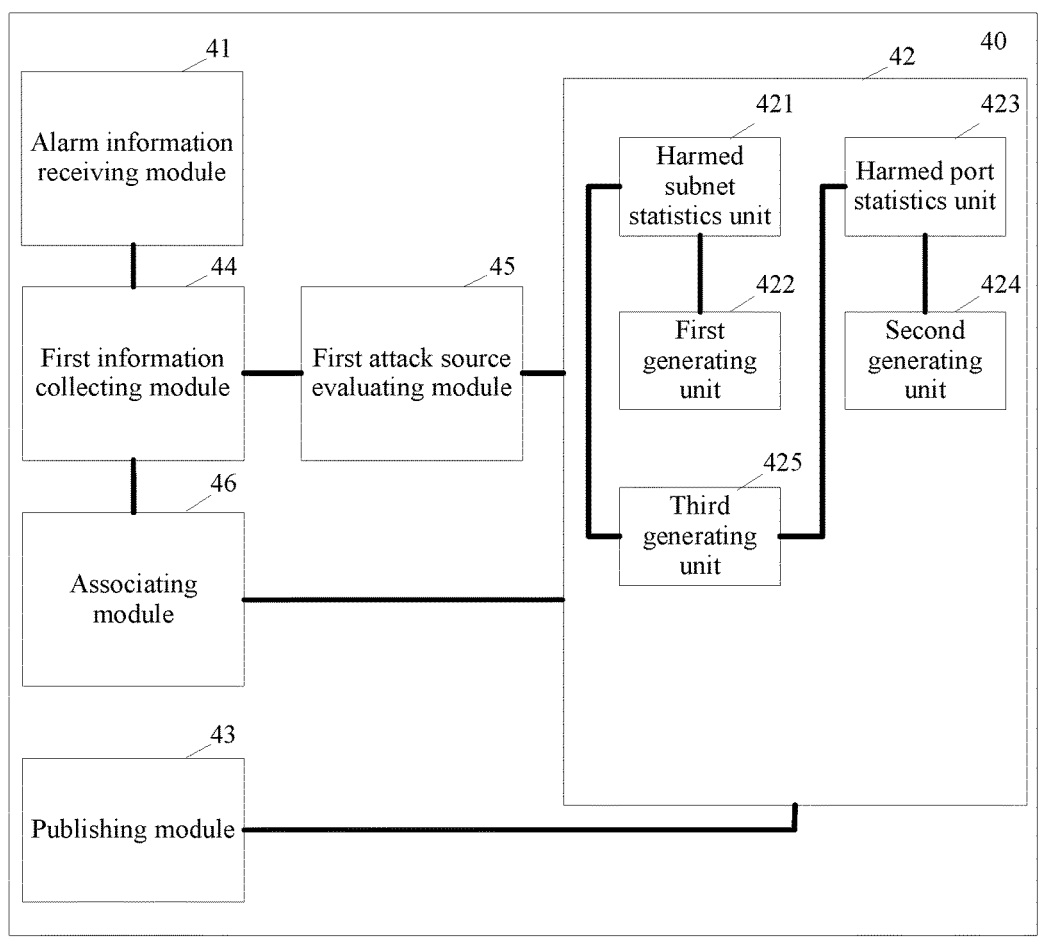

Still further, as shown in FIG. 8, the apparatus 40 may further include an associating module 46 configured to determine a value of association between each attack source and all attacked subnets according to $r^s=[(I-aW)^{-1}-I]\bullet b^s$ before the attack sources are sorted.

In the foregoing formula, $r^s$ represents the value of association between an attack source and all the attacked subnets, $b^s$ represents a Boolean vector of an attack relationship between this attack source and all the attacked subnets, s represents an identifier of this attack source, a represents a threat value of this attack source, I represents an identity matrix, and W represents an address of this attack source.

Correspondingly, the third generating unit 425 is further configured to, for an attacked subnet, use a threat value of each attack source that attacks the subnet and a value of association between each attack source that attacks the subnet and the subnet to determine a danger level imposed by each attack source that attacks the subnet on the subnet, and sort the attack sources that attack the subnet in descending order of the danger levels and generate a blacklist corresponding to the subnet.

Figure 9:
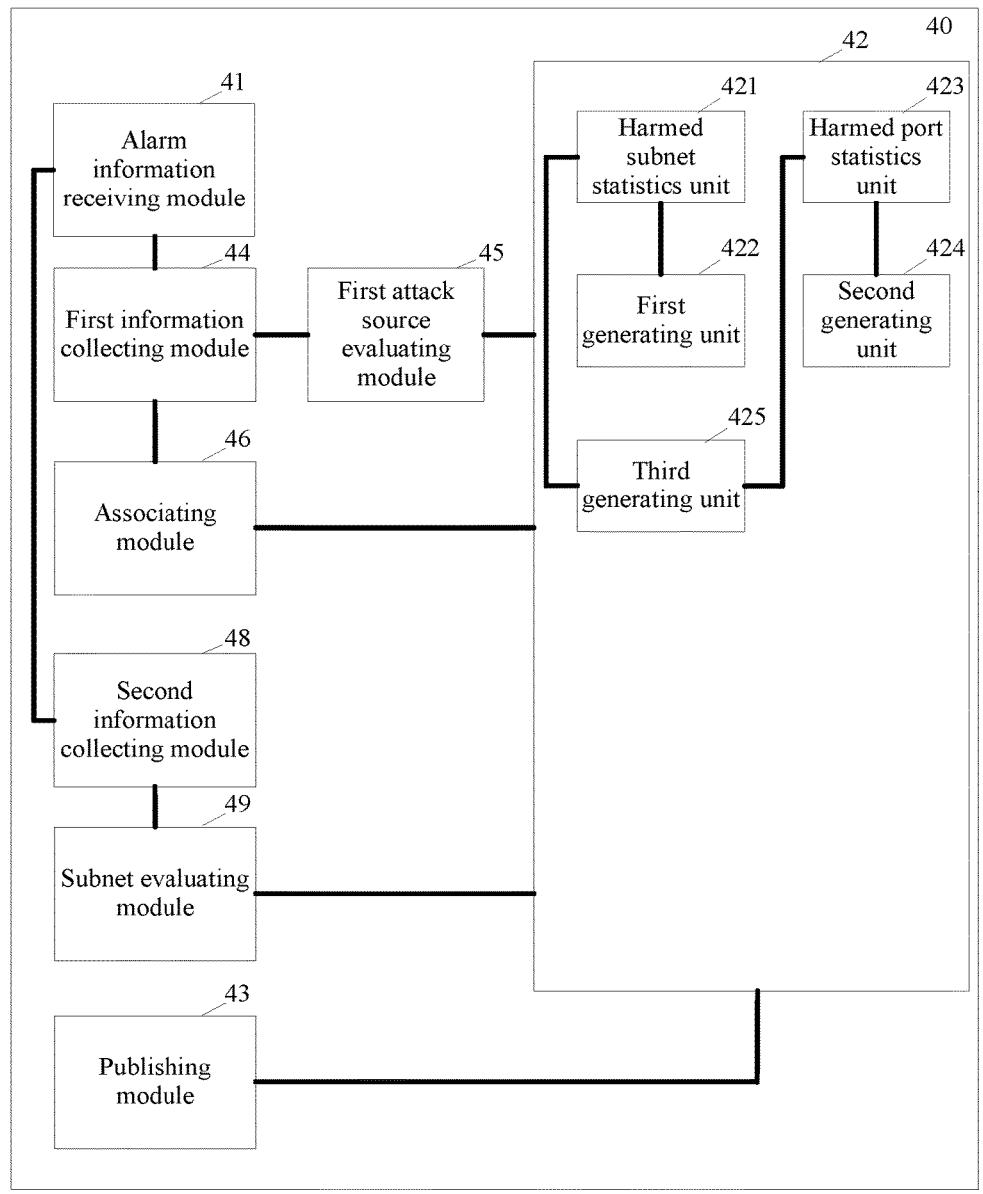

Still further, optionally, as shown in FIG. 9, the apparatus 40 may further include a second information collecting module 48 configured to determine harm information of each subnet before the attack sources are sorted, where the harm information includes the number of attack sources that attack a subnet, the number of attacked ports of this subnet, duration of attack on this subnet, and a sum of amounts of data received by this subnet from all attack sources, and a subnet evaluating module 49 is configured to obtain a vulnerability value according to the harm information of each subnet.

Correspondingly, the third generating unit 425 is further configured to for an attacked subnet, use the threat value of each attack source that attacks the subnet, a value of association between each attack source that attacks the subnet and the subnet, and the vulnerability value of the subnet to determine a danger level imposed by each attack source that attacks the subnet on the subnet, and sort the attack source that attack the subnet in descending order of the danger levels and generate a blacklist corresponding to the subnet.

Optionally, the alarm information receiving module 41 is configured to obtain the alarm information from an Openflow asynchronization message sent by the subnet.

In the apparatus for improving network security according to this embodiment of the present disclosure, alarm information reported by subnets in a network system after the subnets are attacked may be obtained, a blacklist may be generated specially for a subnet according to information about an attack launched by each attack source in the subnet, where the blacklist further adapts to characteristics or network security conditions of the subnet, and the blacklist records an attack source being a high threat to the subnet. In this way, the subnet may use the blacklist to take corresponding defensive measures, individualized defense may be performed for different subnets in the network system, and the subnet can more efficiently defend against the attack source recorded in the blacklist. Compared with the prior art in which only an attacked subnet executes a corresponding security policy, and subnets that are not attacked yet are not notified, the embodiment of the present disclosure can achieve, when one subnet is attacked, an attack source of this attack is published to subnets that are not attacked yet in a network system, and an alert is raised in the form of a blacklist, so that the subnets that are not attacked yet in the network system may make defensive preparations against the attack source of this attack. In this way, after an attack source attacks a subnet, even if the same attack source launches an attack on the subnets that are not attacked yet, because other subnets may make defensive preparations, a possibility of being cracked is reduced. Therefore, security of the entire network system is improved.

Figure 10:
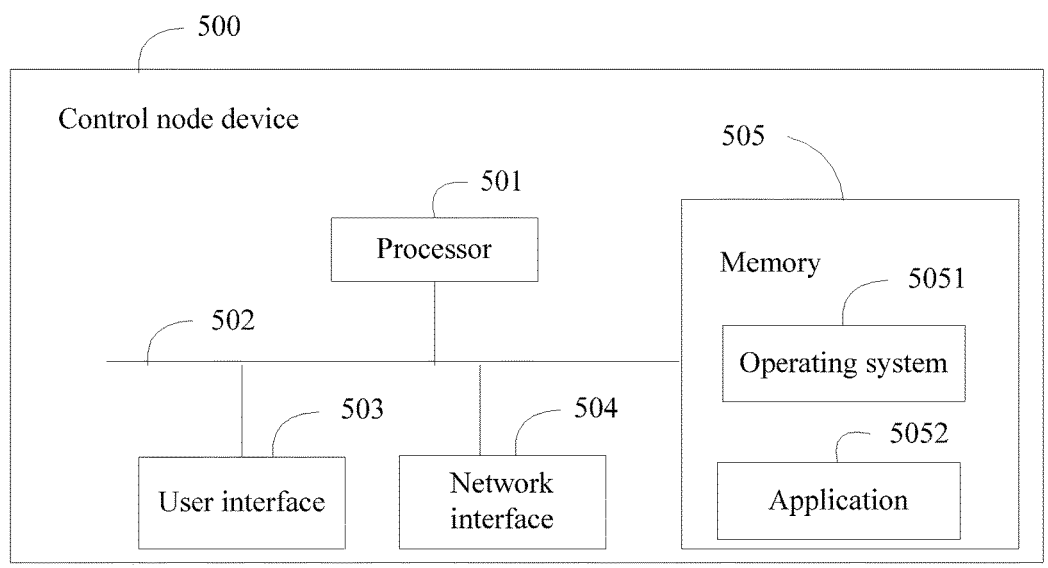
FIG. 10 is a schematic structural diagram of a device for implementing a technical solution of the present disclosure according to an embodiment of the present disclosure.

An embodiment of the present disclosure further provides a structure of a control node device 500 for improving network security. As shown in FIG. 10, the control node device 500 includes at least one processor 501 such as a central processing unit (CPU), at least one network interface 504 or another user interface 503, a memory 505, and at least one communications bus 502. The communications bus 502 is configured to implement connection and communication between the components. Optionally, the control node device further includes a user interface 503, which includes a display, a keyboard, or a click device (such as a mouse, a trackball, a touchpad or a touchscreen). The memory 505 may include a high-speed random access memory (RAM), and may further include a non-volatile memory, for example, at least one magnetic disk memory. Optionally, the memory 505 may include at least one storage apparatus that is far away from the processor 501.

In some implementation manners, the memory 505 stores an executable module or a data structure, or a subset thereof, or an extended set thereof that includes an operating system 5051, including various system programs, and configured to implement various basic services and process hardware-based tasks, and an application module 5052, including various applications, and configured to implement various application services.

The application module 5052 includes but is not limited to an alarm information receiving module 41, an analyzing module 42, a publishing module 43, a first information collecting module 44, a first attack source evaluating module 45, an associating module 46, a second information collecting module 48, a subnet evaluating module 49, a harmed subnet statistics unit 421, a first generating unit 422, a harmed port statistics unit 423, a second generating unit 424, and a third generating unit 425.

For specific implementation of each module in the application module 5052, refer to the corresponding modules in the embodiment shown in FIG. 6, which is not described herein again.

The processor 501 is configured to obtain alarm information by using the network interface 504, where the alarm information includes address information of an attack source that attacks a subnet of the at least two subnets and identification information of the attacked subnet of the at least two subnets, use the alarm information to sort the attack sources in descending order of threat levels, and use a sorting result as a blacklist, and send, by using the network interface 504, the obtained blacklist to at least one subnet that is not attacked yet in the network system.

The processor 501 is configured to use the identification information of the attacked subnet to determine the number of subnets attacked by each attack source of multiple attack sources corresponding to the address information of the attack sources, and sort the attack sources in descending order of the number of the attacked subnets.

The processor 501 is further configured to use the identification information of the attacked subnet to determine the number of ports attacked by each attack source of the multiple attack sources corresponding to the address information of the attack sources; and sort the attack sources in descending order of the number of the ports attacked by each attack source.

The processor 501 is further configured to determine threat information of each attack source before the attack sources are sorted, where the threat information includes duration of an attack launched by the attack source, an amount of data from the attack source, the number of subnets attacked by the attack source, and the number of ports attacked by the attack source, and obtain a threat value of each attack source according to the threat information of the attack source.

Correspondingly, the using the alarm information to sort the attack sources in descending order of threat levels, and using a sorting result as a blacklist includes using the alarm information to sort the attack sources in descending order of the threat values of the attack sources, and using a sorting result as a blacklist.

The processor 501 is further configured to: determine a value of association between each attack source and all the attacked subnets according to $r^s=[(I-aW)^{-1}-I] \bullet b^s$ before the attack sources are sorted, where $r^s$ represents a value of association between one attack source and all the attacked subnets, $b^s$ represents a Boolean vector of an attack relationship between this attack source and all the attacked subnets, s represents an identifier of this attack source, a represents a threat value of this attack source, I represents an identity matrix, and W represents an address of this attack source.

Correspondingly, the using the alarm information to sort the attack sources in descending order of the threat values of the attack sources, and using a sorting result as a blacklist, includes: for an attacked subnet, using a threat value of each attack source that attacks the subnet and a value of association between each attack source that attacks the subnet and the subnet to determine a danger level imposed by each attack source that attacks the subnet on the subnet; and sorting the attack sources that attack the subnet in descending order of the danger levels and generating a blacklist corresponding to the subnet.

The processor 501 is further configured to determine harm information of each subnet, where the harm information includes the number of attack sources that attack a subnet, the number of attacked ports of this subnet, duration of attack on this subnet, and a sum of amounts of data received by this subnet from all attack sources, and obtain a vulnerability value according to the harm information of each subnet.

Correspondingly, the using the alarm information to sort the attack sources in descending order of the threat values of the attack sources, and using a sorting result as a blacklist includes for an attacked subnet, using the threat value of each attack source that attacks the subnet, a value of association between each attack source that attacks the subnet and the subnet, and the vulnerability value of the subnet to determine a danger level imposed by each attack source that attacks the subnet on the subnet, and sorting the attack sources that attack the subnet in descending order of the danger levels and generating a blacklist corresponding to the subnet.

The processor 501 is further configured to obtain, by using the network interface 504, the alarm information from an Openflow asynchronization message sent by the subnet.

In the control node device for improving network security according to this embodiment of the present disclosure, alarm information reported by subnets in a network system after the subnets are attacked may be obtained, a blacklist may be generated specially for a subnet according to information about an attack launched by each attack source in the subnet, where the blacklist further adapts to characteristics or network security conditions of the subnet, and the blacklist records an attack source being a high threat level to the subnet. In this way, the subnet may use the blacklist to take corresponding defensive measures, individualized defense may be performed for different subnets in the network system, and the subnet can more efficiently defend against the attack source recorded in the blacklist. Compared with the prior art in which only an attacked subnet executes a corresponding security policy, and subnets that are not attacked yet are not notified, this embodiment of the present disclosure can achieve, when one subnet is attacked, an attack source of this attack is published to subnets that are not attacked yet in a network system, and an alert is raised in the form of a blacklist so that the subnets that are not attacked yet in the network system may make defensive preparations against the attack source of this attack. In this way, after an attack source attacks a subnet, even if the same attack source launches an attack on the subnets that are not attacked yet, because other subnets may make defensive preparations, a possibility of being cracked is reduced. Therefore, security of the entire network system is improved.

The embodiments in this specification are all described in a progressive manner, for same or similar parts in the embodiments, refer to these embodiments, and each embodiment focuses on a difference from other embodiments. Especially, a device embodiment is basically similar to a method embodiment, and therefore is described briefly. For related parts, refer to partial descriptions in the method embodiment.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium may be: a magnetic disk, an optical disc, a read-only memory (ROM), a RAM, or the like.

The foregoing descriptions are merely specific embodiments of the present disclosure, but the protection scope of the present disclosure is not limited thereto. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for improving network security in a network comprising a control node in communication with a first subnet and a second subnet, the method comprising:
   obtaining, by the control node, alarm information comprising information of a respective attack source attacking the first subnet and identification information of the first subnet;
   determining threat information of the respective attack source;
   obtaining a threat value of the respective attack source according to the threat information;
   determining a value of an association between the respective attack source and the first subnet based on an attack relationship between the respective attack source and the first subnet by determining the value of the association between the respective attack source and the first subnet according to $r^s=[(I-aW)^{-1}-I]\cdot b^s$, where $r^s$ represents the value of the association between one of each attack source and the first subnet, $b^s$ represents a Boolean vector of the attack relationship between the respective attack source and the first subnet, s represents an identifier of the respective attack source, a represents the threat value of the respective attack source, I represents an identity matrix, and W represents an address of the respective attack source;
   determining, for the first subnet, a danger level imposed by the respective attack source on the first subnet using the threat value of the respective attack source and the value of the association;
   obtaining a blacklist based on the danger level imposed by the respective attack source; and
   sending, by the control node, the blacklist to the second subnet.

2. The method for improving network security of claim 1, wherein the threat information comprises a duration of an attack launched by the respective attack source, an amount of data from the respective attack source, a number of subnets attacked by the respective attack source, and a number of ports attacked by the respective attack source.

3. The method for improving network security of claim 1, wherein obtaining the blacklist based on the danger level imposed by the respective attack source comprises:
   sorting the respective attack source in descending order of danger level imposed by the respective attack source within the blacklist to obtain a sorting result; and
   obtaining the blacklist based on the sorting result, the blacklist including the respective attack source and a threat level corresponding to the respective attack source.

4. The method for improving network security of claim 1, wherein the alarm information is obtained from an OPENFLOW asynchronization message received from the first subnet.

5. The method for improving network security of claim 1, wherein the second subnet has not been attacked by the respective attack source.

6. The method for improving network security of claim 1, wherein the threat information of the respective attack source is determined using the alarm information.

7. A control node for improving network security, and configured to communicate with a first subnet and a second subnet, and the control node comprising:
- a processor; and
- a storage medium coupled to the processor and comprising instructions that are executable by the processor and that cause the processor to be configured to:
  - obtain alarm information comprising information of a respective attack source attacking the first subnet and identification information of the first subnet;
  - determine threat information of the respective attack source;
  - obtain a threat value of the respective attack source according to the threat information;
  - determine a value of an association between the respective attack source and the first subnet according to an attack relationship between the respective attack source and the first subnet by determining the value of the association between the respective attack source and the first subnet according to $r^s=[(I-aW)^{-1}-I]\cdot b^s$, wherein $r^s$ represents the value of the association between one of each attack source and the first subnet, $b^s$ represents a Boolean vector of the attack relationship between the respective attack source and the first subnet, s represents an identifier of the respective attack source, a represents the threat value of the respective attack source, I represents an identity matrix, and W represents an address of the respective attack source;
  - determine, for an attacked subnet, a danger level imposed by the respective attack source on the first subnet using the threat value of the respective attack source and the value of the association;
  - obtain a blacklist based on the danger level imposed by the respective attack source; and
  - send the blacklist to the second subnet.

8. The control node for improving network security of claim 7, wherein the threat information comprises a duration of an attack launched by the respective attack source, an amount of data from the respective attack source, a number of subnets attacked by the respective attack source, and a number of ports attacked by the respective attack source.

9. The control node for improving network security of claim 7, wherein the instructions further cause the processor to be configured to:
- obtain the blacklist based on the danger level imposed by the respective attack source;
- sort the respective attack source in descending order of danger level imposed by the respective attack source within the blacklist to obtain a sorting result; and
- obtain the blacklist based on the sorting result, the blacklist including the respective attack source and a threat level corresponding to the respective attack source.

10. The control node for improving network security of claim 7, wherein the alarm information is obtained from an OPENFLOW asynchronization message received from the first subnet.

11. The control node for improving network security of claim 7, wherein the second subnet has not been attacked by the respective attack source.

12. The control node for improving network security of claim 7, wherein the threat information of the respective attack source is determined using the alarm information.

13. A non-transitory computer readable medium storing codes for improving network security that, when executed by a processor of a computer, cause the processor to:
- obtain alarm information comprising information of a respective attack source attacking a first subnet and identification information of the first subnet;
- determine threat information of the respective attack source,
- obtain a threat value of the respective attack source according to the threat information;
- determine a value of an association between the respective attack source and the first subnet according to an attack relationship between the respective attack source and the first subnet by determining the value of the association between the respective attack source and the first subnet according to $r^s=[(I-aW)^{-1}-I]\cdot b^s$, wherein $r^s$ represents the value of the association between one of each attack source and the first subnet, $b^s$ represents a Boolean vector of the attack relationship between the respective attack source and the first subnet, s represents an identifier of the respective attack source, a represents the threat value of the respective attack source, I represents an identity matrix, and W represents an address of the respective attack source;
- determine, for an attacked subnet, a danger level imposed by the respective attack source on the first subnet using the threat value of the respective attack source and the value of the association;
- obtain a blacklist based on the danger level imposed by the respective attack source; and
- send the blacklist to a second subnet.

14. The non-transitory computer readable medium of claim 13, wherein the threat information comprises a duration of an attack launched by the respective attack source, an amount of data from the respective attack source, a number of subnets attacked by the respective attack source, and a number of ports attacked by the respective attack source.

15. The non-transitory computer readable medium of claim 13, wherein obtaining the blacklist based on the danger level imposed by the respective attack source comprises:
- sorting the respective attack source in descending order of danger level imposed by the respective attack source within the blacklist to obtain a sorting result; and
- obtaining the blacklist based on the sorting result, the blacklist including the respective attack source and a threat level corresponding to the respective attack source.

16. The non-transitory computer readable medium of claim 13, wherein the alarm information is obtained from an OPENFLOW asynchronization message received from the first subnet.

17. The non-transitory computer readable medium of claim 13, wherein the second subnet has not been attacked by the attack sources, and the threat information of the respective attack source is determined using the alarm information.

* * * * *

UNITED STATES PATENT AND TRADEMARK OFFICE
CERTIFICATE OF CORRECTION

PATENT NO.           : 10,476,897 B2
APPLICATION NO.      : 15/641841
DATED                : November 12, 2019
INVENTOR(S)          : Xiaoxin Wu and Jinming Li It is certified that error appears in the above-identified patent and that said Letters Patent is hereby corrected as shown below:

In the Claims

Claim 7, Column 21, Line 4: "security, and" should read "security and"

Signed and Sealed this
Seventh Day of January, 2020

Andrei Iancu
*Director of the United States Patent and Trademark Office*